3,456,497
ENGINE PERFORMANCE MONITORING SYSTEM
Erich Eberl, Bruckmuhl, Germany, assignor to Entwicklungsring Sud GmbH, Munich, Germany, a corporation of Germany
Filed June 6, 1967, Ser. No. 643,998
Claims priority, application Germany, June 14, 1966, E 31,903
Int. Cl. G01n 15/00; G01d 13/22
U.S. Cl. 73—116                          5 Claims

ABSTRACT OF THE DISCLOSURE

An engine monitoring system, particularly for aero and space vehicles with several vertical scale type instruments in side-by-side configuration, a monitor bar ganged to the power lever and overlying the scales whereby individual deviations are readily detected.

---

Indicators with vertical type scales and movable indicating bands have already been proposed for flight instruments and also for engine instruments. This invention provides for the side-by-side configuration of several indicators of this type and integration into one unit affording quick, safe and clear control of engine conditions so that depending on the power lever position linear markings may result in one horizontal line. Thus, it is possible to read the desired performance values for the engines at any time and at a glance. It is not necessary to read individual values on several indicators.

To this effect, indicators are arranged in side-by-side configuration into one unit providing at least the following engine parameters, viz: Inlet/Outlet pressure ratio-engine thrust, engine r.p.m., EGT, fuel flow.

The invention provides for the integration of the instruments into one unit. Indicators for the power lever position are provided at either side of these instruments. The movable scale bands are controlled by a computer that uses power lever position and input from the air data computer to establish a desired value which must be produced by the engine or engines at a given power setting.

These and other objects of the invention will become more apparent to those skilled in the art by reference to the following detailed description when viewed in light of the accompanying drawings, wherein.

Figure 1:
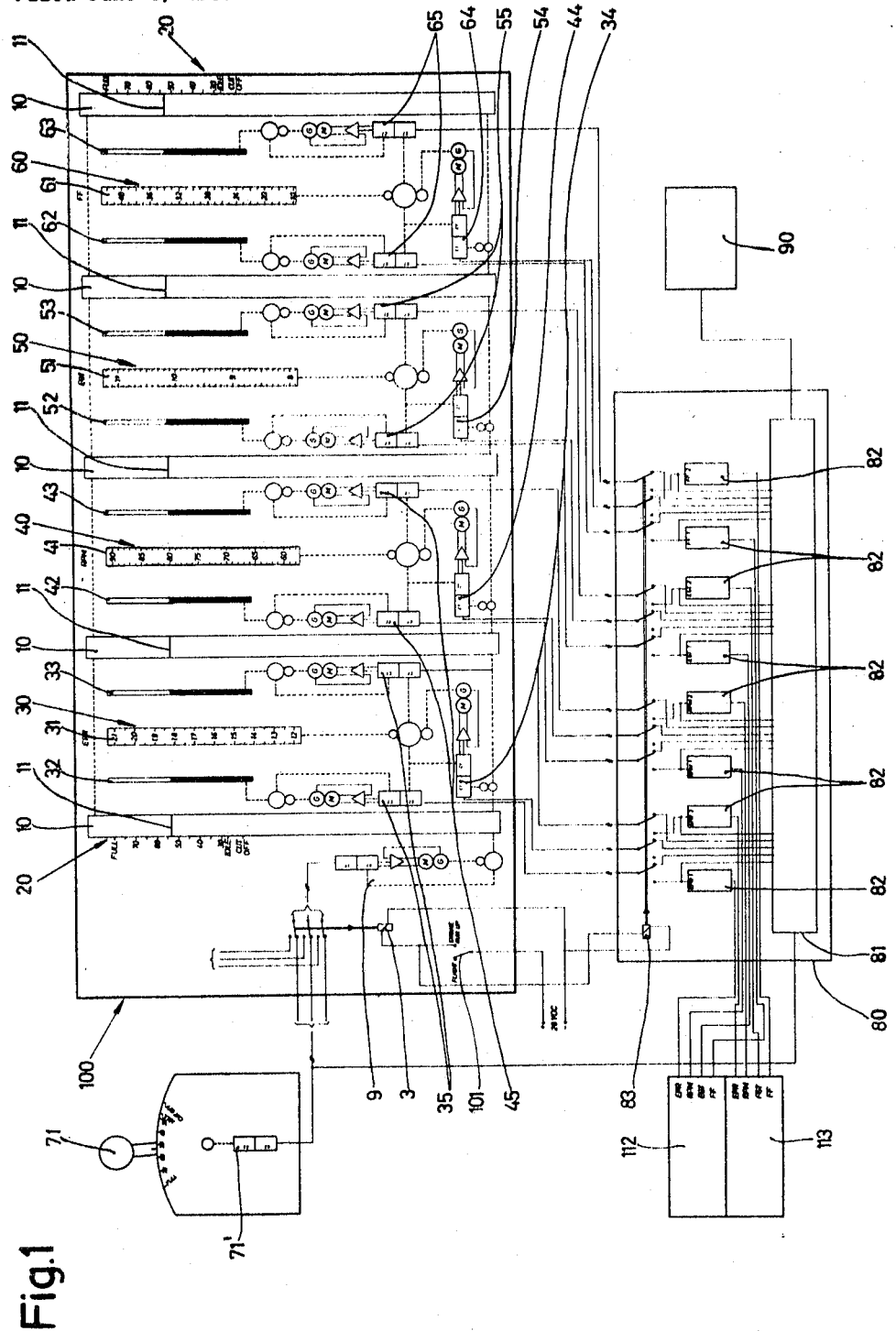
FIGURE 1 is a diagrammatic functional diagram of the invention.
Figure 2:
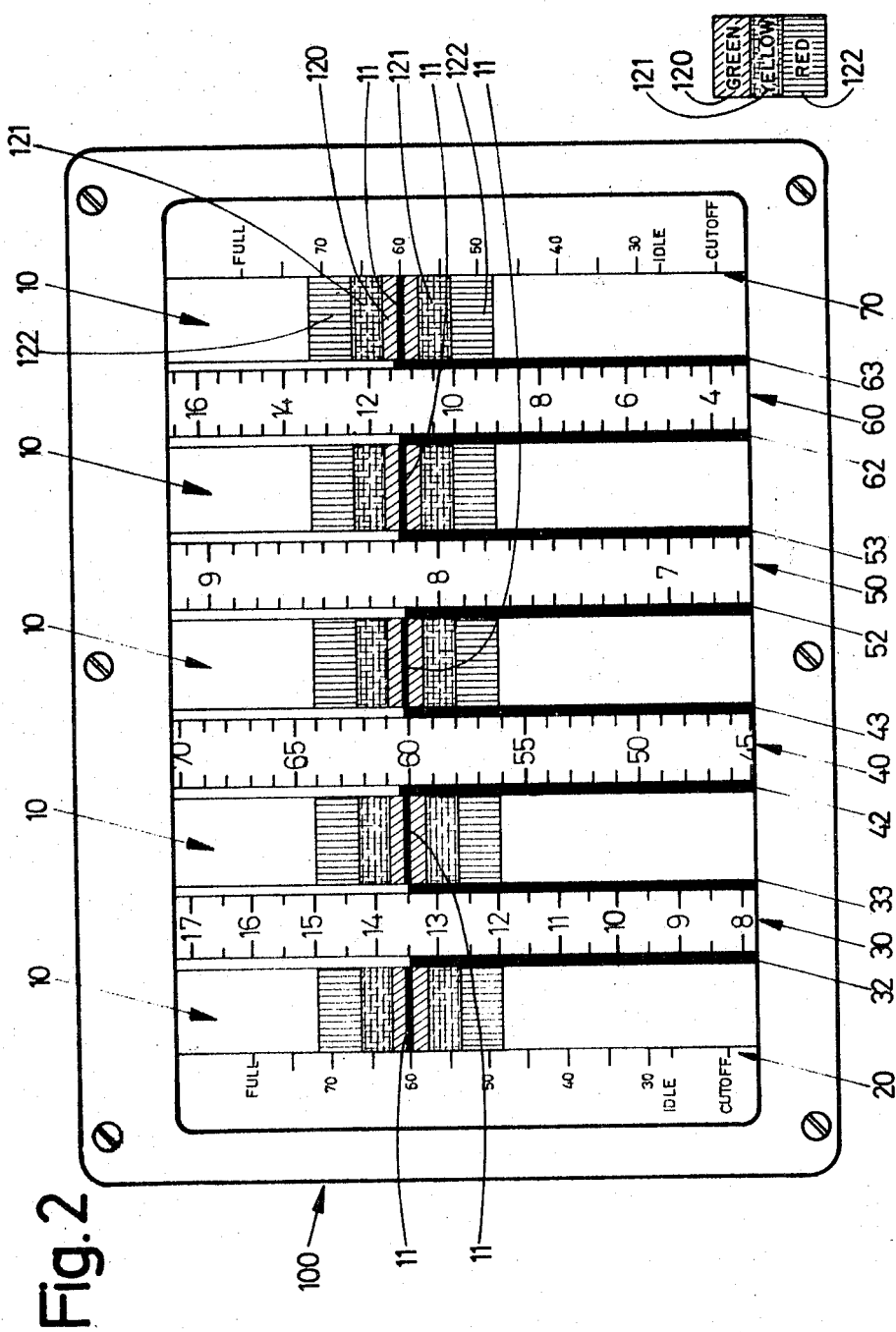
FIGURES 2 to 7 show a view of the unit at various engine conditions.
Figure 3:
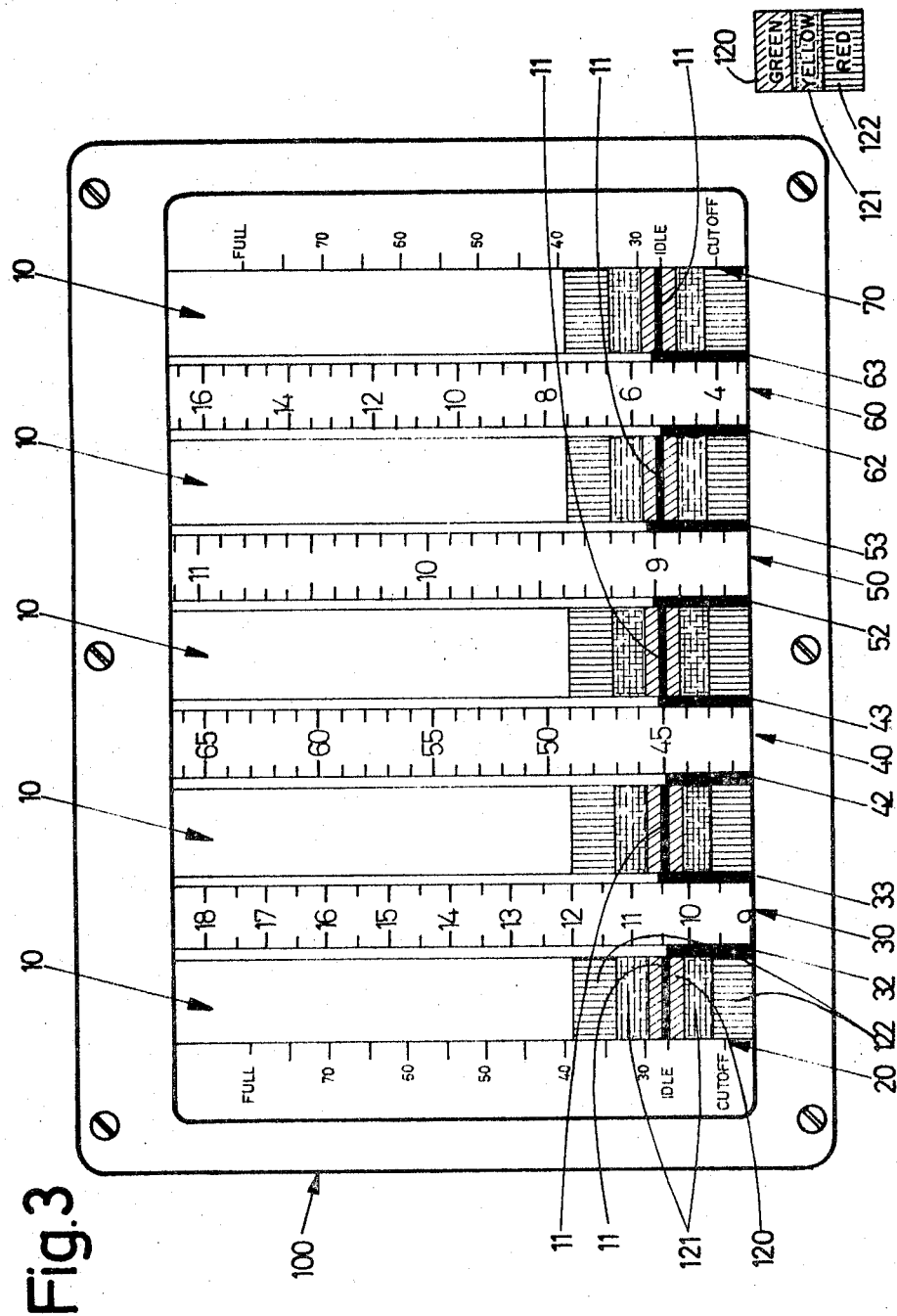
Figure 4:
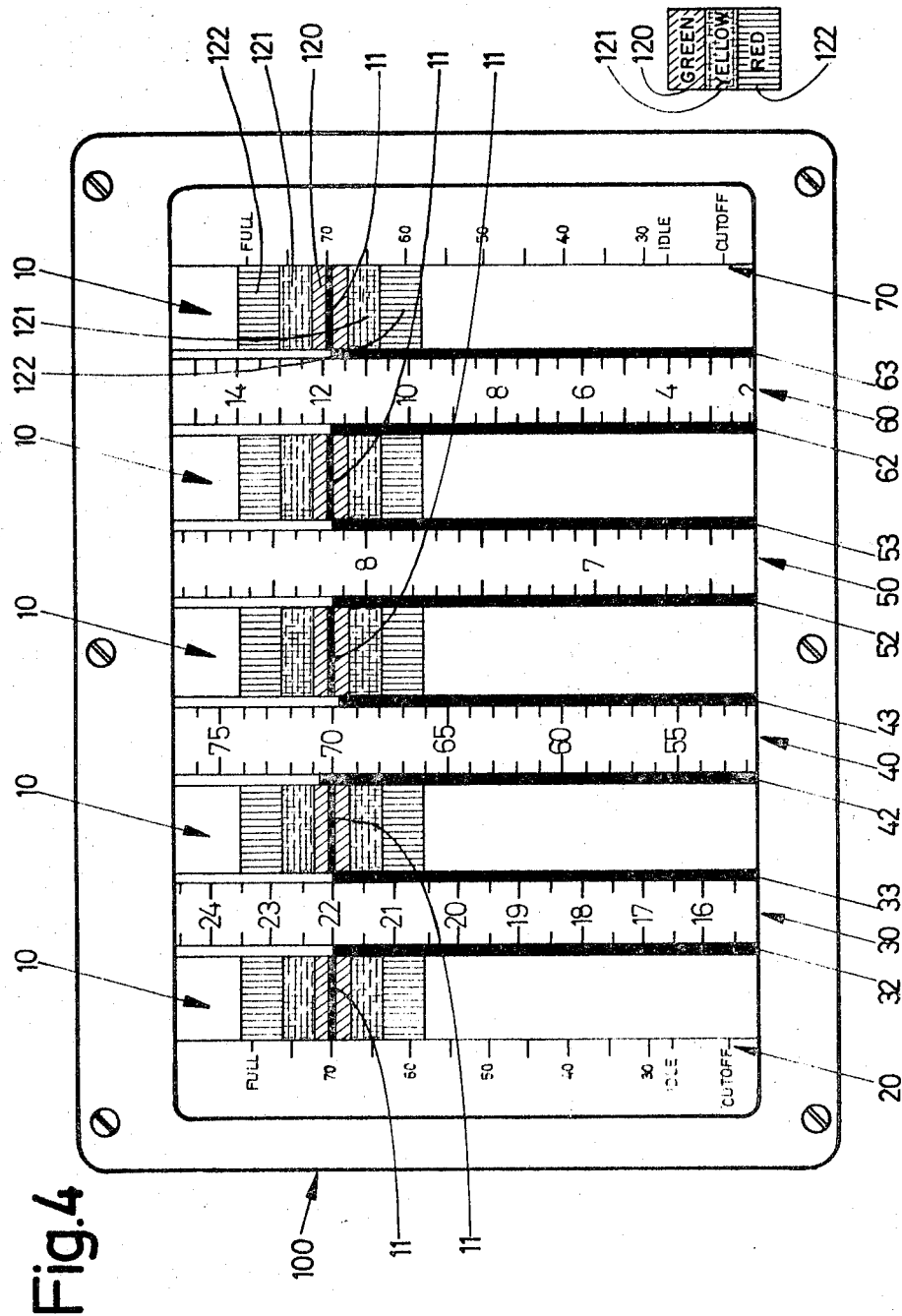
Figure 5:
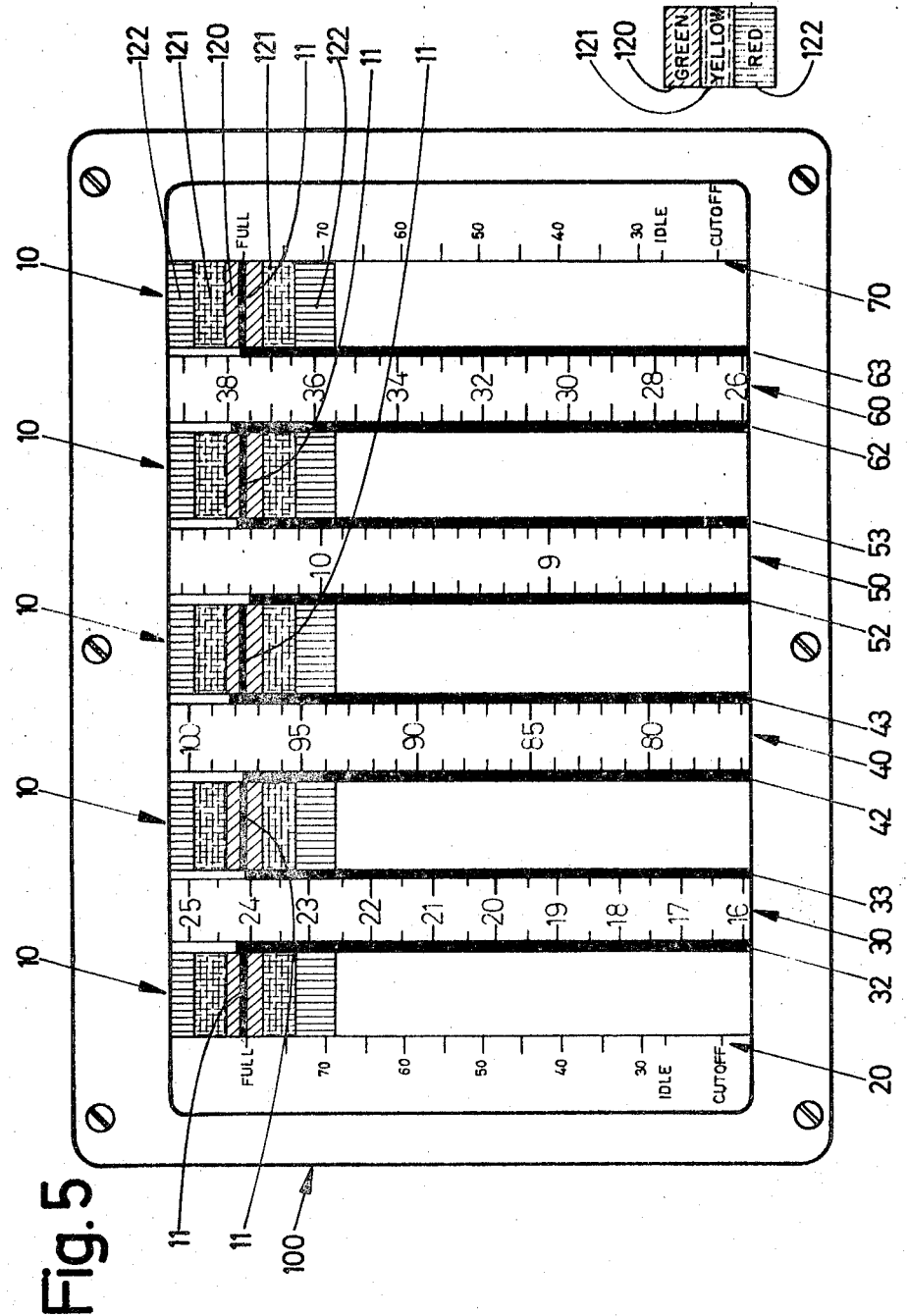
Figure 6:
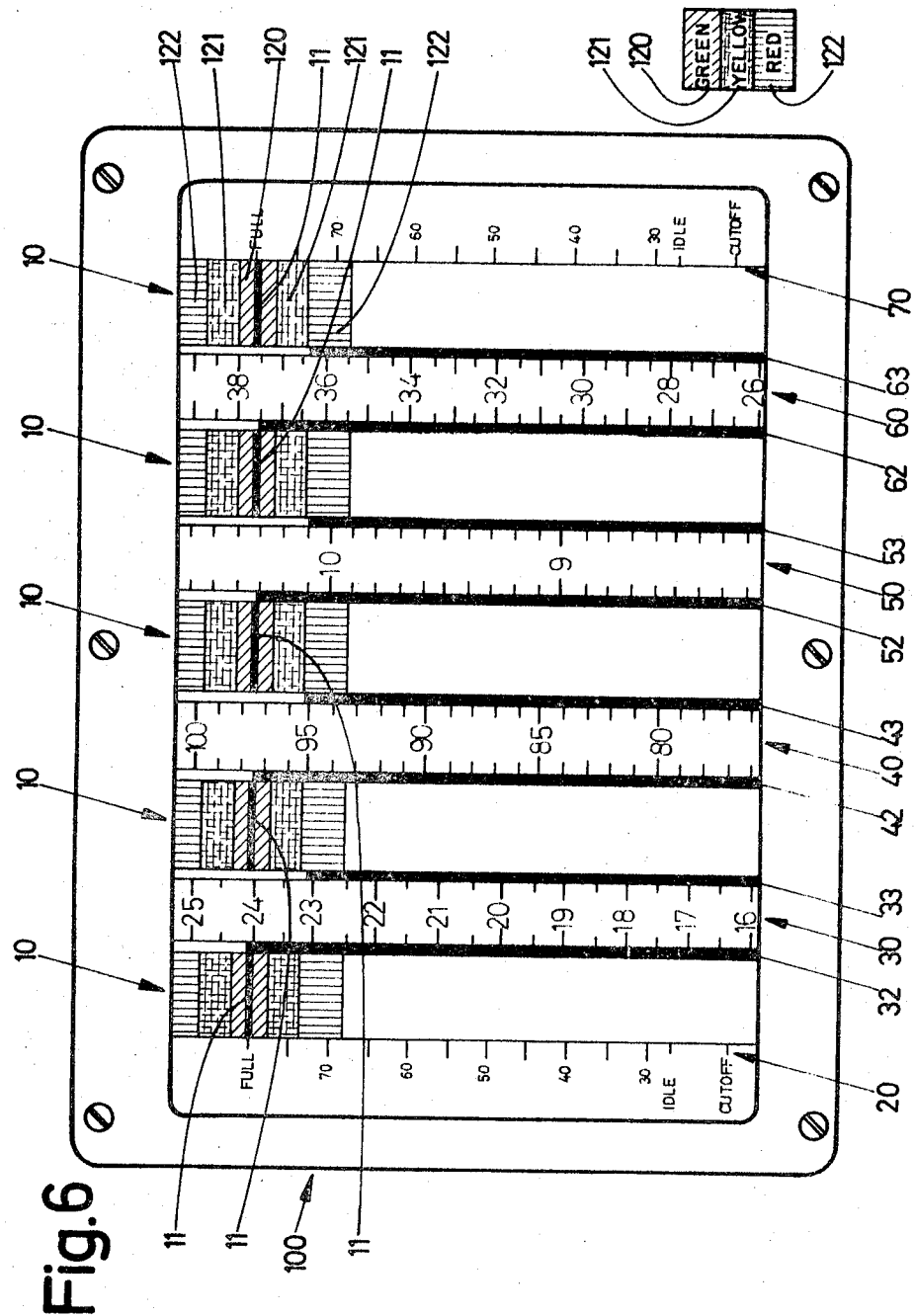

The indicating unit denoted by 100 in FIGURE 1 has several indicators (30, 40, 50, 60) in side-by-side configuration, with the instrument 30 indicating EPR, the instrument 40 r.p.m., instrument 50 EGT and instrument 60 fuel flow (FF). At the left and right hand side and between the instruments are mechanically coupled monitoring bands 10 each connected to a linear marking 11.

At the left and right hand side of the unit 100 are fixed scales 20 which can be calibrated in angular degrees (FIGURES 2 to 7) or in percent of power lever setting 71. The indicators 30, 40, 50, and 60 properly include scale bands 31, 41, 51, and 61 and indicating bands 32, 33, 42, 43, 52, 53, 62, and 63 which are provided at the left and right hand side of the scale band.

Additional components of the monitoring system include an engine computer 80, consisting of the computer for a desired value 81, the signal converters 82 and the relay 83. The engine computer receives input data from air data computer (CADC) 90 available in prior art aircraft and the power lever 71. The engines 112, 113 supply measured data of the individual parameters through the engine computer 80 for the indicating bands 32, 33, 42, 43, 52, 53, 62, and 63.

Movable parts (indications to pilot) in the instrument unit 100 are:

(a) Monitoring bands 10 (PERFORMANCE MONITOR BAR=PM Bar) with marking line 11.

The PM Bar 10 consists of five individual bands which are mechanically connected so that only ganged operation is possible. The PM Bar 10 is controlled by the power lever 71. When the power lever 71 is moved, the PM Bar 10 moves until the angular position of the power lever coincides with the angular marking on the fixed scale 20. The position of the power lever 71 is obtained by reading the PM Bar marking against the fixed scales 20.

(b) Scale bands 31, 41, 51, and 61 (desired value).

These scale bands are movable and controlled by the computer for desired values 81.

(c) Indicating bands 32, 33, 42, 43, 52, 53, 62, and 63 (actual value).

The indicating bands are controlled by the engine values of the engines 112 and 113 through the signal converters 82 in the engine computer 80.

The PM Bar shows the power setting. The scale bands are controlled by the computer for desired values. The computer 80 establishes the desired performance for the engines at a given power setting using the power lever position, input from the CAOC and a specific stored performance diagram. The desired value thus obtained is fed to the scale bands. The scale bands now move until the desired value provided by the computer (scale band indication) is opposite the marking 11 on the PM Bar. Using the marking of the PM Bar as a reference the desired value may now be read.

The values measured at the engines are processed in the signal converters 82 and in the desired value computer and then fed to the indicating bands. These bands now move until the value measured at the engine is equal to the numerical value on the scale band. The indicated value may then be read on the scale band.

Since the desired values are displayed opposite the PM Bar, the indicating bands must also be in the rear vicinity when the engines are operating properly. Thus, a horizontal line is formed right across the indicating unit 100 at any power setting. The pilot only needs to glance briefly at the horizontal line in order to satisfy himself that all indicating bands are present.

If an engine parameter does not change at various power settings, the scale band and the indicating bands are slowed to the new power lever position, even though the signals from the engine and from the desired value computer remain constant. The scale band and the indicating bands move not only as the result of changes in power lever setting but also in response to effects on the engine caused by changes in flight attitude. As the aircraft enters a climb or a descent, the load on the engines increases or decreases. The air data computer feeds these signal changes to the desired value computer. There, new desired values are established and the scale band is displaced to the proper amount. The movement of the indicating bands will be negligible. Therefore, the horizontal line will be retained. The situation described before is similar during a descent except for the altitude which decreases and the air speed which increases. Thus the pilot is not required to move the power lever in order to change the indication.

At the indicating unit 100 or at some other place within the cockpit a two-position switch 101 will be installed. The positions are as follows:

FLIGHT.—This is the normal setting.

ENGINE RUNUP.—This position is required only if the engines are to be checked singly or if the engine computer fails during flight. Placing the switch to the ENGINE RUNUP position isolates the engine computer and the monitoring system functions as a normal indicating system without desired value input.

The monitoring system has all the advantages of normal vertical-type engine monitoring instruments, e.g. ease of reading and space saving.

The monitoring system includes movable scale bands the length of which may be several times that of the fixed scales. This results in the possibility of spreading the indicating scale area rendering accuracy of readout and improving the measuring accuracy.

With the indicating systems currently used, an increased measuring accuracy was hardly worthwhile since the limited readout accuracy tended to offset the effort. Since with the monitoring system proposed the power setting is simultaneously indicated, the pilot is no longer required to move his head in order to check the setting of the power lever. An additional advantage of the subject of this invention is the indication of the desired value. Normal instruments only display the actual value. Therefore, the pilot is never certain whether or not the individual value is favorable for the engine or, whether a dangerous situation is developing in the engine. The proposed system simultaneously supplies desired value and actual value. Thus, a basis for comparison is provided so that a slowly developing dangerous situation may be timely discovered. Above and below the horizontal line 11 on the PM Bar are green, yellow and red areas. Green means safe, normal operation; yellow—caution area; and red—danger.

As long as the engines are operating properly the desired value and the actual value will be nearly equal, all the indicating bands will be in the green areas. If one of the indicating bands operates in the yellow, caution is required. Since the pilot is familiar with the physical operating principle of the engines, he may be able to predict the type of trouble developing in the engine and so be in a position to take the necessary action. With conventional instruments this is possible only to a rather limited degree. The outstanding advtantage of the system proposed in this application is the fact that all indicating bands are at the same level no matter what the power setting is, i.e. they make up a horizontal line along with the PM Bar. This enables the pilot to determine at one glance whether the engines are functioning properly. He is not required to read numerical values and a deviation of any of the indicating bands is easily detected as the horizontal line will be disturbed. If the pilot wishes to read numerical values he is provided with an indicator having a higher degree of measuring and readout accuracy. This advantage of the proposed system substantially relieves the pilot and he is afforded more time to devote his attention to flying and tactical missions. In addition, the positive cognizance of the status of his engines gives him more assurance which not only adds to the successful execution of his mission but also serves to prolong the service life of his aircraft and, not least, contributes to his own safety.

With the vertical scale type instruments used to date the pilot is in all cases required to take readings, i.e. he has to spend time-consuming moments in devoting eye movements to the bands that are at different levels, an effort which impairs concentration. When he has taken the reading he knows the engine parameters, but he is still uncertain whether the engines operate properly since the desired values are missing.

Another advantage worth mentioning is the redundancy inherent in the system. By placing the switch 101 in the ENGINE RUN-UP position the monitoring system is reduced to a conventional engine monitoring system. Even though the engine computer should fail, the pilot would not be lost since he is still supplied with the engine parameters, although the disadvantages would be as described above.

For the technical realization of the system proposed the proven follow-up systems are utilized. It is well known that a deflection of the rotor in the control transmitter produces a signal in the control transformer. The same is true if the rotor of the transmitter is kept at a standstill and the stator of the transmiter or the stator of the control transformer is moved. These properties are utilized in the proposed system. The control transformers may of course be eliminated if the signals are properly mixed for the amplifiers. The proposed system may also be realized by using other technologies. Mention is made in this context of electric luminescence which would eliminate nearly all movable parts. For the purpose of technical explanation of the proposed systems the approach using A.C. synchros is considered to give the clearest picture. Since the other indicating instruments operate in the same manner, only the function of the indicating instrument 30 is explained.

The system is designed for two engines. Four parameters per engine are indicated. The system includes the indicating unit 100, the desired value computer 80 and the engine control transmitters. A two-position switch 101 is installed on the unit or in the cockpit. The switch may be placed in the following positions:

FLIGHT

In this position the power lever 71 controls the PM Bar 10. The PM Bar 10 is slaved to the power setting from CUT-OFF to FULL. The power setting is indicated at the far left and at the far right hand side 20 of the indicating unit. The desired value computer 80 supplies a signal, corresponding to the power lever position on the scale band 31 which adjusts itself opposite the PM Bar 10. The measurements taken on the engine are fed to the indicating bands 32, and 33. These bands adjust themselves opposite the scale band 31. During normal operation all indicating bands are at the same level for any given power setting.

ENGINE RUN-UP

When the engines are checked separately, e.g. following engine replacement, during ground run etc., the indicating bands may entirely disappear since only a specific length of the scale is shown. Therefore, no readings can be taken. This situation can be prevented by placing the switch in the ENGINE RUN-UP position. In this position, one scale appears (the scale band has two scales) which places the entire range of the individual parameter into the visible position of the indicating unit. The desired value computer is removed from the circuit and the signals from the engines are applied directly to the indicating bands. The bands are then at different levels as is the case with conventional equipment.

The engine computer 80 includes signal converters 82 and the desired value computer 81. The signal converters convert the measurements obtained from the engine into signals suitable for follow-up systems.

The desired value computer stores one or more desired curves of the individual engine parameters, e.g. desired curve for r.p.m. at altitude 0, mach number 0, airspeed 0, ambient temperature 15° C. The desired value computer 81 receives its command signals from the power lever 71, i.e. any new power setting is relayed to the computer. Using power lever position, air data such as altitude supplied from the CAOC 90, airspeed, mach number, ambient temperature etc. and the stored desired curve, the desired value computer calculates a value which the engines are required to maintain. This value is fed to the scale band drive.

Operating principle of the PM Bar drive 9.

A control transmitter (CX) 71' is mechanically linked to the power lever. The signals generated by the CX are relayed to the follow-up system of the PM Bar drive 9. The follow-up system 9 deflects the PM Bar 10 and the stators 34, 44, 54, and 64 of the control transformers (CT) of the scale bands. The latter components move accordingly and deflect at the same time the stators 35, 45, 55, 65 of the CT's for the indicating bands.

Therefore, when the power lever is moved, the PM Bar, the scale bands and the indicating bands are uniformly slowed to the power setting.

Operating principle of the indicating mechanisms.

Each indicating mechanism includes four movable indicating components that are independent of one another. They are located in the indicating field of the unit. The four components are:

(a) PM Bar 10.

The PM Bar is slaved to the power lever in the proper sense, i.e. when the power lever is moved to FULL, the PM Bar also moves to FULL.

(b) Scale Band 31, 41, 51, 61.

It is controlled by the desired value computer and is read against the PM Bar. Normally, the scale band moves in the opposite sense with reference to the movements of the PM Bar and the indicating bands.

(c) Indicating bands for engines 1 and 2.

These are controlled by the engine transmitters. The value measured at the engine is indicated on the scale band. Normally, the indicating bands move in the same direction as the PM Bar.

The PM Bar and the bands are capable of performing three technically usefull movements relative to one another. These movements are:

(a) No movement (symbol: 0).

(b) One or several bands move with one or several other bands at the same speed and in the same direction (symbol: $\theta$).

(c) One or several bands perform movements relative to one or several other bands at different speeds either in the same or in opposite directions. This includes like speeds but opposite directions (symbol: —).

With the aid of the symbols and using the techniques of combination, all possible movements of the PM Bar and the bands are specified. The listing refers to one indicating band only, since the indicating band for the other engine would not yield new results.

Since the PM Bar is controlled by the power lever, only two movements are possible:

(a) It can be at rest (symbol: 0)

(b) It can move up or down (symbol: —)

The PM Bar cannot move at the same speed and in the same direction as the other bands since it is the controlling element for the other bands.

SUMMARY OF MOVEMENTS:

Abbreviations:
    PMB=PM Bar
    SKB=Scale band
    AB=Indicating band

Condition:
| | | | | | |
|---|---|---|---|---|---|
| 1 | PMB 0 | → | SKB 0 | → | AB 0 |
| 2 | PMB 0 | → | SKB 0 | → | AB — |
| 3 | PMB 0 | → | SKB 0 | → | AB $\theta$ |
| 4 | PMB 0 | → | SKB — | → | AB 0 |
| 5 | PMB 0 | → | SKB — | → | AB — |
| 6 | PMB 0 | → | SKB — | → | AB $\theta$ |
| 7 | PMB 0 | → | SKB $\theta$ | → | AB 0 |
| 8 | PMB 0 | → | SKB $\theta$ | → | AB — |
| 9 | PMB 0 | → | SKB $\theta$ | → | AB $\theta$ |
| 10 | PMB — | → | SKB 0 | → | AB 0 |
| 11 | PMB — | → | SKB 0 | → | AB — |
| 12 | PMB — | → | SKB 0 | → | AB $\theta$ |
| 13 | PMB — | → | SKB — | → | AB 0 |
| 14 | PMB — | → | SKB — | → | AB — |
| 15 | PMB — | → | SKB — | → | AB $\theta$ |
| 16 | PMB — | → | SKB $\theta$ | → | AB 0 |
| 17 | PMB — | → | SKB $\theta$ | → | AB — |
| 18 | PMB — | → | SKB $\theta$ | → | AB $\theta$ |

DISCUSSION OF THE CONDITIONS 1 TO 18

First, all conditions which are not possible from a technical point of view are eliminated.

Condition 3: PMB 0 → SKB 0 → AB $\theta$

The indicating band cannot move at the same speed and in the same direction when PMB and SKB are stationary.

Conditions 7, 8 and 9:
    PMB 0 → SKB $\theta$ → AB 0
    PMB 0 → SKB $\theta$ → AB —
    PMB 0 → SKB $\theta$ → AB $\theta$ The scale band cannot move at the same speed and in the same direction when PMB is stationary. Discussion of the remaining conditions:

Condition 1: PMB 0 → SKB 0 → AB 0

(a) Unit deenergized (b) Unit energized: Signals from the computer and from the engine are at the same level.

For all other conditions the unit must be energized.

Condition 2: PMB 0 → SKB 0 → AB —

The value measured at the engine changes i.e. it decreases ($\downarrow$) or increases ($\uparrow$).

Condition 4: PMB 0 → SKB — → AB 0

The computer changes its value either $\downarrow$ or $\uparrow$. Since in the case of movement of the scale band 31, the CT stator 35 of the indicating band 32 is also deflected, it would follow the scale band movement. If the indicating band is required to remain stationary the engine must undergo a change by the proper amount so as to offset the movement of the CT stator, i.e. a signal must be supplied to the indicating band by the engine which is of equal strength but of opposite polarity.

Condition 5: PMB 0 → SKB — → AB —

The computer and the engine change the signals. The signals may be of like or opposite polarity, however, they are of different strength.

Condition 6: PMB 0 → SKB — → AB $\theta$

The computer changes its value either $\downarrow$ or $\uparrow$. The engine signal remains steady, the indicating band is only slaved by the movement of its CT stator.

Condition 10: PMB — → SKB 0 → AB 0

The power lever is moved. Since, at the same time, the CT stator 34 of the scale band 31 and also the CT stator 35 of the indicating band are moved, both bands would be displaced. Therefore, the computer must supply signals of the same speeds and strength but of opposite polarity in order to offset the movement of the power lever. The engine must not change its signals. Condition 10 is almost never experienced.

Condition 11: PMB — → SKB 0 → AB —

The power lever is moved. The scale band remains at rest since the PMB movement is compensated by computer signals. The engine changes its signals in the sense of the movement of the PMB or in opposite direction and at different strength.

Condition 12: PMB — → SKB 0 → AB $\theta$

The power lever is moved. The scale band remains stationary since the PMB movement is compensated by computer signals. The engine produces and feeds signals to the indicating band which correspond to the PMB movement with respect to sense, speed and strength.

Condition 13: PMB — → SKB — → AB 0

The power lever is moved. The scale band receives signals from the computer that deviate from the PMB movement. The indicating band is stationary only if the signal inputs from the engine are of the proper nature so as to compensate PMB movement and scale band movement.

Condition 14: PMB — →   SKB — →   AB —

The power lever is moved. The scale band receives signals from the computer, the indicating band receives signals from the engine which are different from the PMB movement and each other.

Condition 15: PMB — →   SKB — →   AB θ

The power lever is moved. The scale band receives signals from the computer which are different from the PMB movement. The engine does not change its signals, the indicating band, because of the deflection of its CT stator 35 which has its origin in the movement of the scale bands, is slaved to the scale band.

Condition 16: PMB — →   SKB θ — →   AB 0

The power lever is moved. The computer does not change its signals, the scale band, due to the deflection of its CT stator 34, is slaved to the PMB. If the indicatin gband is to remain stationary, the engine must produce signals that compensate the movement of the scale band.

Condition 17: PMB — →   SKB θ — →   AB —

The power lever is moved. The computer does not change its signals, the scale band, because of the deflection of its CT stator 34, is slaved to the PMB. The engine feeds signals to the indicating band which are different from the scale band movement.

Condition 18: PMB — →   SKB θ — →   AB θ

The power lever is moved. The signal of the computer and that of the engine remain steady. The scale band is slaved to the deflection of its CT stator 34 and since the scale band also moves the CT stator 35 of the indicating band, this band is also slaved.

The normal operation of the engine performance monitoring system is described in the following section:

As long as the engines are not operating, the power lever and, therefore, the PM Bar are in the CUT-OFF position. The indicating bands in this position form a horizontal line, the scale bands indicate "O". Before the engines are started, the power lever is moved to IDLE, with the PM Bar following to this position. Through this action the desired value computer receives a signal to obtain the data for the IDLE position from the stored desired data curve, to correct these data for the prevailing barometric pressure and temperature and to apply the resulting signal to the scale band. The scale band starts to move and stabilizes opposite the PM Bar. The measurements taken at the engines cause the indicating bands to move until the corresponding value on the scale band is reached. During the engine start procedure, the indicating bands wil probably overshoot the horizontal line since, in some cases the scale bands will have to run over long distances. For example, the desired EGT value for engine 145 is approximately 800° C. in the IDLE position. Therefore, the scale band will be required from 0° C. to 800° C. Since quick response of the indicating bands is required, they will overshoot the horizontal IDLE line. The indicating bands come to a standstill as soon as they have reached the value measured at the engine. However, the scale band continues to move, dragging the indicating bands with it until the desired value corresponds to the PM Bar. If the engines are operating properly, all indicating bands, except for minor deviations, will be at a common level.

A similar series of events takes place at any change in power setting. However, the indicating bands will hardly, if at all, overshoot the PM Bar as the scale bands will not be required to move over long distance.

The CT stators of the scale bands, and by the latter bands the CT stators of the indicating bands, will be deflected by any movement of the power lever. That is to say, the bands are slaved even though no changes in the desired values or changes in the engine signals are present. If, however, these signals change, they overlay the signal resulting from the CT stator movement. This would cause erroneous indications since the amplifiers of the follow-up systems receive a signal that is the sum or difference of the CT stator signal and of the computer or engine signal. In order to prevent a false engine or computer signal, the CT stator signal must be compensated. This process takes place in the computer. For this purpose the outputs of the signal converters are first fed into the computer. Since the CT stators are synchronized to the movements of the power lever, and the latter quantity is known to the engine computer, the computer is also aware of the angular position of the CT stators. Therefore, this unit is in a position to properly process the signals from the desired value computer and from the engines.

Signal conversion does not take place when the power lever is at rest. Under such conditions, signal changes from the desired value computer and from the engines occur only if the attitude of the aircraft changes, such as entering a climb or descent whereby the load on the engines is increased or decreased.

When the switch labelled FLIGHT/ENGINE RUN-UP is placed in the ENGINE RUN-UP position, the relay 3 is energized. Now, the CT stator of the PM Box drive mechanism receives a constant signal from a reference signal sensor thus causing the scale band to move until the second, a condensed scale, appears in the indicating unit. The PM Bar and the indicating bands disappear. The delayed action relay 83 in the computer is now energized, removing the computer from the circuit and relaying the engine signals directly to the indicating bands which stabilize opposite the fixed scale. The indicating bands are no longer at the same level.

The sensors used heretofore to measure engine parameters may also be used with this engine monitoring system. Likewise, the signal converters are of a conventional design. No additional computers will be required in the aircraft to support the invented system as available desired value computers may be utilized.

The indicating unit proper may consist of a case that houses only the PM Bar and its drive. The indicators may be in the form of separate plugs, to be removed by pulling out either forwards or backwards. Thus, if one indicator fails, it will not be necessary to replace the complete indicating unit.

The unit may also be equipped with warning flags which show up if one of several scale bands or indicating bands are out of operation.

The invented system features great advantages. With modern supersonic aircraft especially, the pilot is afforded, due to this system, the necessary simple, stress-relieving and time saving reading of his monitoring instruments.

The invention provides for the application of markings to the individual bands, identifying the safe and unsafe operating ranges. These markings may be placed on the monitoring bands or on the indicating bands registering the actual values. Markers of this sort are indexed 120, 121 and 122 in FIGURES 2 to 7. The marker 120 identifies the normal operating range, marker 121 the caution area and marker 122 the prohibited area. Therefore, for example—as may be seen in FIGURE 6—indicators 30, 40, 50, and 60 show a dangerous situation, which is identified by the bands 33, 43, 53, and 63 with the marker 122 having already crossed the bordering line of step 11, the pilot is warned that remedy action must be undertaken without delay.

Figure 7:
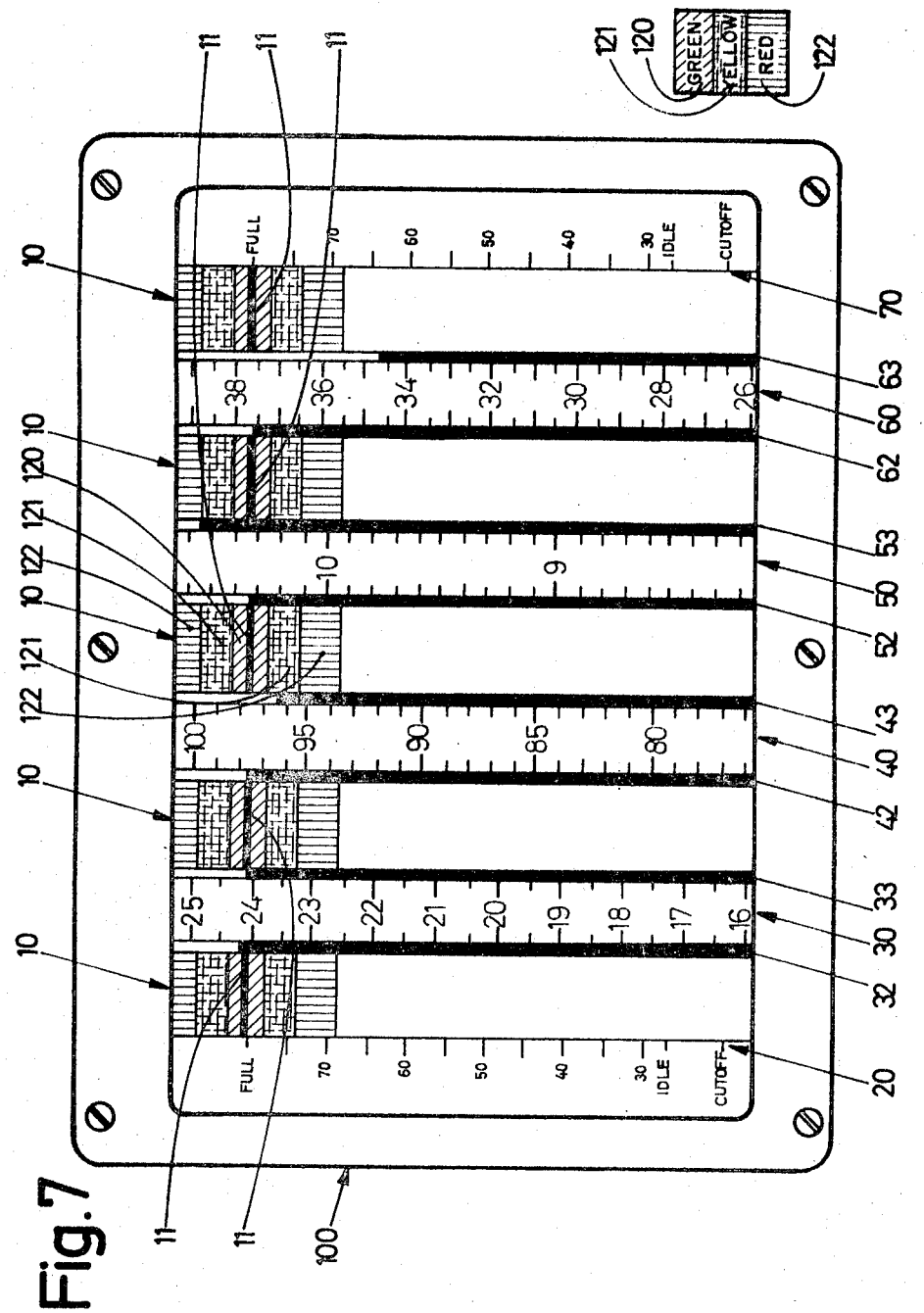

In a similar way, FIGURE 7 shows that band 43 is in the yellow area 121, that band 53 is at the bordering line between the yellow area 121 and the red area 122 and that band 63 is already beyond the red area 122.

In a general manner, where there has been disclosed effective and efficient embodiment of the invention, it should be well understood that the invention is not limited to such embodiment, as there might be changes made in the arrangement, disposition, and form of the parts without departing from the principel of the present invention as comprehended within the scope of the accompanying claims.

What is claimed is:

1. An engine performance monitoring system and display panel comprising a first set of indicators arranged in side-by-side parallel relationship on said panel and each having said first scales indicating a certain engine performance parameter, a second set of indicators on said panel, the individual units of which have second scales respectively disposed adjacent said first scales, a power control lever, a power control lever position scale on said panel, a monitoring bar disposed transversely across said scales, a coupling unit moving said bar to a position corresponding to the position of said power control lever, first means to move the scales of said second set of indicators to a desired reading of engine performance which will underlie said monitoring bar, second means to move the scales of said first set of indicators to actual readings of engine parameters whereby a visual inspection of said monitoring bar with respect to said first and second set of scales will depict the normalcy or unusual departure in engine performance between the desired and actual parameters.

2. The system and panel recited in claim 1 wherein said first means includes a computer reading known performance charts for particular power lever settings.

3. The system and dislay of claim 2 wherein a manually operable switch is disposed between said computer and said panel.

4. The system and panel recited in claim 1 wherein said scales spread for greater accuracy.

5. The system and panel recited in claim 1 wherein the scales of said first set of indicators are imprinted with color indicia for estimating a departure from safe working parameters.

References Cited

UNITED STATES PATENTS

| 2,844,988 | 7/1958 | Lize et al. | 116—136.5 X |
| 2,988,690 | 6/1961 | Love et al. | 116—136.5 X |
| 3,287,965 | 11/1966 | Brahm et al. | 73—117.3 |

RICHARD C. QUEISSER, Primary Examiner

J. W. MYRACLE, Assistant Examiner

U.S. Cl. X.R.

116—136.5